Patented Jan. 29, 1935

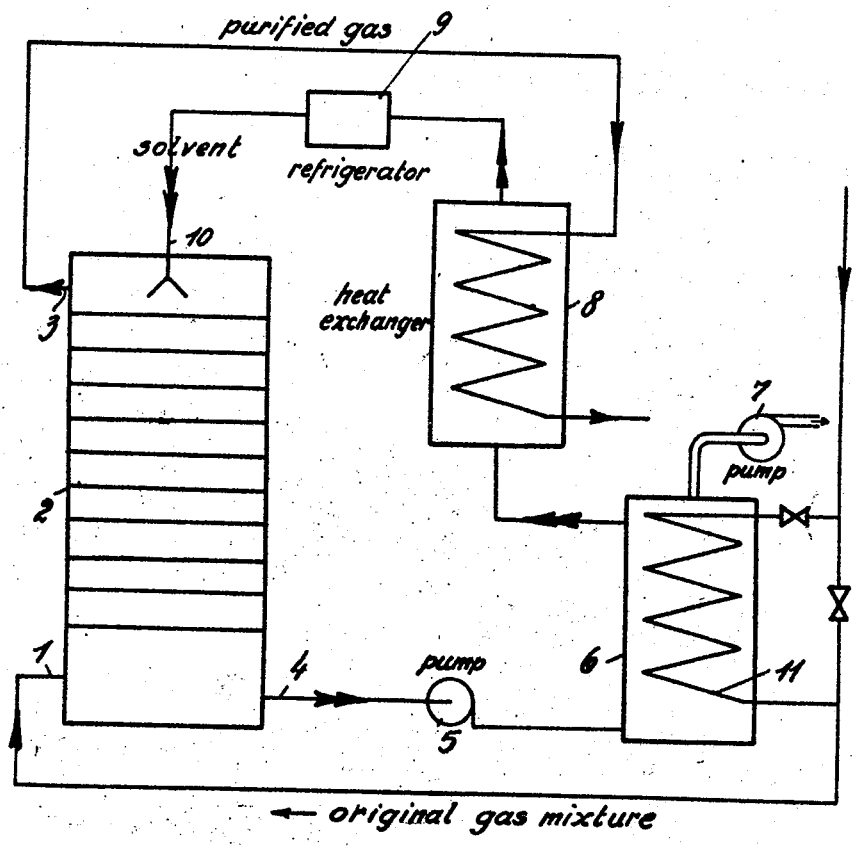

1,989,273

UNITED STATES PATENT OFFICE 1,989,273

PRODUCTION OF ACETYLENE

Walter Grimme, Oberhausen - Sterkrade - Nord, and Heinrich Tramm, Oberhausen-Holten, Germany Application January 27, 1933, Serial No. 653,770
In Germany February 5, 1932

6 Claims. (Cl. 260—170)

Our invention relates to the production of acetylene from hydrocarbons by thermic decomposition and one of its purposes is to provide means whereby a purer acetylene can be recovered in the process than was hitherto possible.

If acetylene is produced from hydrocarbons by heating them for instance under reduced pressure and taking care to limit the time of heating in such manner that as little carbon as possible is formed in consequence of the decomposition, the acetylene formed by decomposition is frequently accompanied by, diacetylene in quantities, amounting for instance to from .5 to 5%. The presence of this gas in the acetylene creates great difficulties since it tends to form resinous bodies. If the acetylene is intended to be treated for the production of acetaldehyde or the like, the presence of impurities, such as are formed in consequence of the admixture of diacetylene, is highly undesirable. For these reasons the diacetylene must be separated from the acetylene as thoroughly as possible. However this removal appears particularly difficult in view of the fact that acetylene and diacetylene are substantially equally soluble in the solvents applicable to this purpose.

We have now found that in spite of these difficulties a separation of the diacetylene from acetylene can be effected in a surprising manner, if the gas mixture is treated at a temperature below zero (32° F.) with a ketone, preferably with acetone. Instead of pure acetone, which, owing to its high steam tension, gives rise to losses, mixtures of acetone with other high boiling ketones, for instance cyclohexanon, ethyl-methylketone or diethylketone may be used. However other solvents, such as for instance vinylacetate, acetaldehyde, etc. as such or mixtures of such solvents have proved useful for this purpose.

The gas mixture cooled down as afore-described is preferably treated with the solvent in a washer of a well known kind provided with a row of superposed plates, the gas mixture being passed into the washer from below in counter-current to the solvent which trickles down from the plates.

The quantity of solvent or washing liquid should be limited in such manner that at the operating temperature, (for instance 20° C. below zero) the liquid is quickly saturated with acetylene, the capacity of the liquid to dissolve diacetylene being however preserved for a much longer time.

If the mixture of acetylene and diacetylene is thus washed with a limited quantity of a washing liquid or solvent, the diacetylene is washed out in a practically complete manner, while only a small quantity of acetylene is taken up by the solvent.

The acetylene itself may then be recovered by washing with larger quantities of the same solvent, the temperature being lowered for instance to 80° C. below zero, if the gas mixture contains for instance 10 to 15% acetylene.

The dissolved diacetylene may then be treated directly, for instance by hydrogenation, to produce butylene and butane. Alternatively the diacetylene may be isolated from the solution either by freezing out or by raising the temperature, preferably under reduction of pressure. Any acetylene which may be present in this solution may then be collected separately or may be returned into the original gas mixture, this being particularly recommendable in case that the acetylene should still be mixed with some diacetylene.

After isolation of the diacetylene the solvent may be reused in the washing process.

In view of the fact that the solubility of acetylene is the greater the lower the temperature, it appears as a rule preferable to effect the washing out of acetylene from gas mixtures containing same at the lowest possible temperatures. According to the present process we prefer dissolving the diacetylene at a temperature which is not much below 0° C. and preferably not below 40° C. below zero.

Example

A dry gas mixture containing besides hydrogen, methane and nitrogen about 10% acetylene and about 0.5% diacetylene, is passed through a washer, such as illustrated diagrammatically by way of example in the drawing affixed to this specification and forming part thereof, in which 1 is the gas inlet of the washer 2, 3 being the outlet for the purified gas. The washing liquid, for instance acetone, cooled down to 20° C. below zero enters the washer at 10 and having washed out the diacetylene from the mixture is withdrawn at 4 to be conveyed by the pump 5 to the tank 6 containing a coil 11 traversed by the fresh gas mixture from the decomposition, which transmits its heat to the washing liquor or solvent. This latter is freed from the gases dissolved therein and more particularly from the diacetylene by the pump 7. The washing liquor thus freed from gases flows through the heat exchanger 8 traversed by the cold gases escaping from the washer 2 and back to this washer after having been cooled down further in its passage through the refrigerating machine 9.

Per cubicmetre gas passed through the washer per hour 5 liters acetone are consumed and after about 20 liters acetylene have been dissolved in this quantity of acetone during the first hour the solvent is saturated for acetylene, but is still capable of freely taking up diacetylene. After about 35 liters diacetylene have been dissolved in the acetone, the gases escaping at 3 are practically free from diacetylene. On the solution containing the diacetylene being heated to room temperature, some acetylene will first escape, the rest of acetylene and all the diacetylene being liberated only by slightly lowering the pressure by pumping, care being however taken to retain a pressure which is considerably higher than the vapor tension of acetone at room temperature. Alternatively the diacetylene and such acetylene as may still be present in the solution may be liberated by passing a current of nitrogen through the solution.

The washing out of the residual acetylene from the solution liberated from diacetylene may be effected at a low temperature, for instance at 80° C. below zero.

Various changes may be made in the details disclosed in the foregoing specification without departing from the invention or sacrificing the advantages thereof.

We claim:—

1. The method of separating diacetylene from gas mixtures containing acetylene comprising washing the mixture with a quantity of a solvent, which is insufficient for dissolving the major portion of the acetylene present in the mixture, at a temperature above the temperature at which greater quantities of acetylene will go into solution.

2. The method of separating diacetylene from gas mixtures containing acetylene comprising washing the mixture with a quantity of a ketone, which is insufficient for dissolving the major portion of the acetylene present in the mixture, at a temperature above the temperature at which greater quantities of acetylene will go into solution.

3. The method of separating diacetylene from gas mixtures containing acetylene comprising washing the mixture with a quantity of acetone which is insufficient for dissolving the major portion of the acetylene present in the mixture, at a temperature above the temperature at which greater quantities of acetylene will go into solution.

4. The method of separating diacetylene from gas mixtures containing acetylene comprising washing the mixture with a quantity of a mixture of acetone and a higher boiling ketone, which is insufficient for dissolving the major portion of the acetylene present in the mixture, at a temperature above the temperature at which greater quantities of acetylene will go into solution.

5. The method of separating diacetylene from gas mixtures containing acetylene comprising washing the mixture with a quantity of acetone, which is insufficient for dissolving the major portion of the acetylene present in the mixture, at a temperature of 0 to 40° C. below zero.

6. The method of separating diacetylene from gas mixtures containing acetylene comprising washing the mixture with a quantity of acetone, which is insufficient for dissolving the major portion of the acetylene present in the mixture, at a temperature of about 20° C. below zero.

WALTER GRIMME.
HEINRICH TRAMM.